United States Patent [19]

Pethick, deceased et al.

[11] E Re. 29,574

[45] Reissued Mar. 14, 1978

[54] PLAYTHING COMPRISING MOVABLE SUPPORTS AND A RUNNING LINEAR FLACCID LINE

[76] Inventors: Ford Crago Pethick, deceased, late of Cranford, N.J.; by Ella D. Pethick, executrix; by F. Laurence Pethick, executor, both of P.O. Box 61, Cranford, N.J. 07016

[21] Appl. No.: 702,868

[22] Filed: Jul. 6, 1976

Related U.S. Patent Documents

Reissue of:

[64] Patent No.: 3,826,493
Issued: Jul. 30, 1974
Appl. No.: 281,922
Filed: Aug. 18, 1972

U.S. Applications:

[63] Continuation-in-part of Ser. No. 87,959, Nov. 9, 1970, abandoned.

[51] Int. Cl.[2] ..... A63F 9/00

[52] U.S. Cl. ..... 273/1 R; 46/1 R; 272/8 N

[58] Field of Search ..... 272/1 R, 75; 273/1 R; 46/1 R, 51; 181/138

[56] References Cited

U.S. PATENT DOCUMENTS

| | | | |
|---|---|---|---|
| 355,363 | 1/1887 | Weinhaus | 181/29 |
| 674,431 | 5/1901 | Black | 272/75 |
| 2,059,603 | 11/1936 | Pflaum | 46/33 |
| 2,854,786 | 10/1958 | Sabo | 46/1 R |
| 3,082,838 | 3/1963 | Gajdosik | 181/138 |

FOREIGN PATENT DOCUMENTS

| | | | |
|---|---|---|---|
| 164,848 | 9/1958 | Sweden | 272/75 |

*Primary Examiner*—Richard C. Pinkham
*Assistant Examiner*—Arnold W. Kramer

[57] ABSTRACT

A plaything comprising two mug-shaped receptacles and a linear flaccid line which may be a cord, a chain, a string of beads, or the like. One end of said line is held inside one receptacle, and the other end of said line is held inside the other receptacle, both of said receptacles being at least large enough to house substantially all of said line. Prior to using the plaything, the two receptacles are placed side by side on a horizontal surface and substantially all of said line is hand-fed into one receptacle so as to be amassed in a heap with the last fed-in parts resting on top of the previously fed-in parts. Then, when the receptacle housing most of said is positioned above the other receptacle, said line — because of gravity — will run from the upper receptacle into the lower receptacle. When most of said line is amassed in a heap in the lower receptacle, the positions of the receptacles are interchanged and the direction of running of said line reversed. A receptacle having a spout for guiding the running of said line is disclosed as a modification. Also different types of lines which are suitable for use as part of the plaything of this invention are illustrated.

26 Claims, 11 Drawing Figures

PLAYTHING COMPRISING MOVABLE SUPPORTS AND A RUNNING LINEAR FLACCID LINE

Matter enclosed in heavy brackets [ ] appears in the original patent but forms no part of this reissue specification; matter printed in italics indicates the additions made by reissue.

RELATED APPLICATIONS

This application is a *reissue of my original U.S. Pat. No. 3,826,493, dated July 30, 1974, Ser. No. 281,922, filed Aug. 18, 1972, which was a* continuation-in-part of my application, Ser. No. 87,959, filed Nov. 9, 1970, for a PLAYTHING AND METHOD OF PLAYING A GAME, now abandoned.

SUMMARY OF THE INVENTION

The closest prior art, of which the applicant is aware, is U.S. Pat. No. 2,854,786, issued Oct. 7, 1958 to J. L. Sabo. The Sabo patent discloses an amusement device employing a highly flexible helical type spring, adjacent turns of which are integral with one another. A plurality of light weight balls are positioned within the helical spring. Means are provided for transferring the major portion of the spring and the balls from a first closure plate located in one end of the spring to a second closure plate located in the other end of the spring. This transfer is accomplished by alternately changing the relative elevations of the closure plates.

The present invention comprehends a plaything comprising two supports and a linear flaccid line, opposite ends of which are held to the supports. Prior to using the plaything, the two supports are placed side by side on a horizontal surface, and substantially all of the said line is hand-fed to one of the supports where said line is deposited or amassed in a heap with the last fed-in parts landing substantially on the previously fed-in parts. When the supports are positioned so that the support carrying most of said line is above the other support, said line — because of gravity — will run from the upper support to the lower support. When most of said line has been amassed in a heap on the lower support, the relative positions of the two supports will be changed and the direction of running of the line reversed.

The invention also comprehends the following items: A plaything in which the supports have upstanding members providing rims over which the line runs when it is being transferred from one support to the other. A plaything in which the upstanding members form walls which house the line as it is amassed on the supports. A plaything in which the supports are in the form of receptacles for receiving and housing the line as it is deposited on the supports. A plaything in which the upstanding members or walls are formed with openings which may be in the form of spouts for guiding the running of the line. A plaything in which the line is conjoined and/or concatenated in a manner similar to that of a string of beads or a chain.

It is to be understood that as used herein, the term "line" comprehends linear lines of the type to which a cord belongs, that the word "flaccid" comprehends lacking firmness or elasticity, in other words flabby, that the word "conjoined" emphasizes both the togetherness of a joining and the separateness of the things joined, and that the word "concatenated" comprehends the joining or linking together in a series. The above terms, as employed in the specification and appended claims, are not intended to include the helically coiled spring disclosed in the above cited Sabo U.S. Pat. No. 2,854,786, which patent identifies the coiled spring shown therein as a "Slinky."

Accordingly it is an object of this invention to provide a novel plaything which can be used by an individual for personal enjoyment.

An other object of the invention is to provide a novel plaything incorporating two movable supports, either of which can be positioned above the other so that a line carried by the upper support will — due to gravity — run to the other support.

A further object of the invention is to provide novel playthings which can be used by two or more contestants to determine which of the contestants is most proficient in transferring the line from one support to the other support.

A still further object of the invention is to provide a novel method for playing a game involving the use of two receptacles and a linear flaccid line.

The foregoing and other objects, features and advantages of the invention will be apparent from the following more particular description of the invention, in conjunction with the accompanying drawings.

DESCRIPTION OF THE PREFERRED EMBODIMENT

Figure 1:
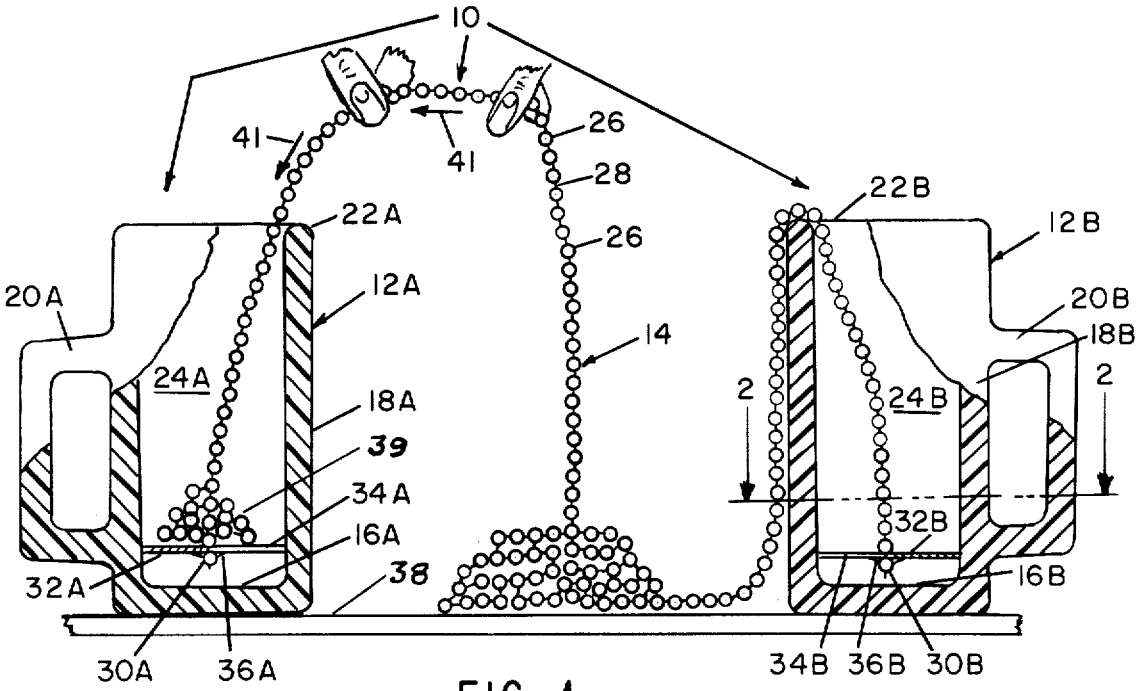
FIG. 1 is a side elevational view, partly in cross section, of a preferred embodiment of the invention, including movable supports and a [preferrably] *preferably* linear flaccid line, and showing a method of hand feeding a line, in the form of a bead chain, to one of the supports in preparation to using the plaything.

As illustrated in FIGS. 1 through 6 and in 8, a plaything 10 comprises a first movable support or receptacle 12A, a second movable support or receptacle 12B and a linear preferably flaccid conjoined, concatenated line 14 shown here in the form of a metallic bead chain.

The movable supports or receptacles 12A and 12B are shown as made of plastic and as being identical in shape and form, although it will be understood that supports or receptacles of different material, size and configuration may be used. The support 12A, which is shown in the form of a mug-shaped receptacle, comprises a bottom 16A, an upstanding, preferably cylindrical, encircling member or sidewall 18A, and means for holding, moving and positioning the receptacle 12A in the form of a handle 20A, which handle is associated with the outer surface of the wall 18A. The upper edge of the sidewall 18A is formed with a convex portion or smoothly rounded surface or lip or rim 22A. As stated above, the support or receptacle 12B is a duplicate of the support or receptacle 12A, and the support 12B comprises a bottom 16B, an upstanding, preferably cylindrical, encircling member or sidewall 18B, and a means for moving and positioning the receptacle 12B in the form of a handle 20B, which handle is secured to the outer surface of the sidewall 18B. The upper edge of the sidewall 18B is formed with a convex portion or smoothly rounded surface or lip or rim 22B. The bottom 16A, the sidewall 18A and the lip 22A define an upwardly open cavity 24A of sufficient capacity to receive and house at least most of the line 14, and the bottom 16B, the sidewall 18B and the line 22B define an upwardly open cavity 24B also of sufficient capacity to receive and house at least most of the line 14. It will be understood that the handles 20A and 20B may be omitted, in which instance the bottom 16A and the bottom 16B, or the sidewalls 18A or 18B may be grasped by a person using the plaything 10, and thus the bottom 16A and 16B and/or the sidewalls 18A and 18B will serve as a means for moving and positioning the receptacles 12A and 12B.

The linear conjoined concatenated line 14 shown in FIGS. 1 through 8 is preferably in the form of a conventional flaccid metallic bead chain comprising a series of hollow spherical beads 26 conjointly linked together by dumbbell shaped connectors or links 28, each connector having two heads 29 — 29, one head being located in one spherical bead and the other head being located in an adjacent bead. In one form of the plaything embodying this invention, a bead chain having a length of approximately twenty feet and weighing about two-tenths of an ounce per foot has been found satisfactory, and it will be understood that other chains and other forms of linear flaccid lines similar to those shown in FIGS. 9 through 11 may also be employed in a manner hereinafter further explained.

Opposite ends 30A and 30B of the line 14 are preferably held within the cavities 24A and 24B formed by the walls 18A and 18B of the supports 12A and 12B [respectfully] *respectively* by means of removable means or members in the form of thin circular disks 32A and 32B, each disk having a diameter or size slightly greater than the inside diameter or size of the cavities 24A and 24B [respectfully.] *respectively.* Preferably the disks 32A and 32B will be made of cardboard or other suitable material, the disks having radially extending slots 34A and 34B [respectfully,] *respectively,* and the slots being arranged to receive one of the connectors 28 in the manner similar to that shown in FIGS. 1 and 2 for the disk 32B. Adhesive tape or glue 36A and 36B may be used to further secure the ends 30A and 30B to the disks 32A and 32B, which disks may be forced into the bottoms of the cavities 24A and 24B. If desired, glue, not shown, may be used to hold the disks and therefore the ends 30A and 30B within the cavities 24A and 24B. Making the disks of a heavy metal will, due to the weight, hold the ends 30A and 30B in place.

OPERATION

Figure 3:
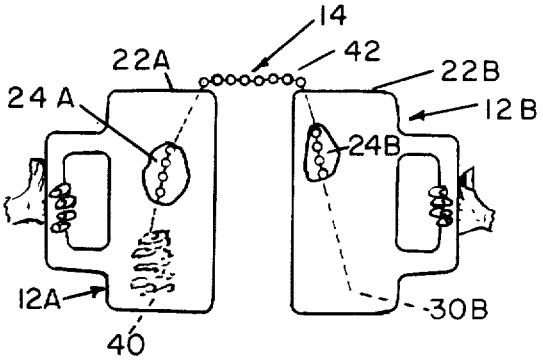
FIG. 3 is a reduced scale, front elevational, partly cutaway view of the plaything of FIG. 1 showing the plaything held at the "ready" position as an individual starts to use the plaything.

In preparing to use the plaything 10 in a desirable manner, the supports 12A and 12B are placed at substantially the same elevational position adjacent to one another on a horizontal surface 38, such as a tabletop or floor. Then substantially all or at least a large portion of the line 14 is hand-fed, as shown by arrows 41 — 41 in FIG. 1, into one of the supports, as for example the support 12A, so that a large or first portion 40 of the line 14 will — because of its flaccidity — become amassed in a heap 39 on one of the supports or in other words be housed in one of the cavities, say the cavity 24A, as shown in FIGS. 1 and 3 in layers with the last fed-in parts of the portion 40 resting on top of the previously fed in parts. This assures that the line 14 will not become tangled, which would make it difficult to orderly remove the first or large portion 40 from the cavity.

Figure 2:
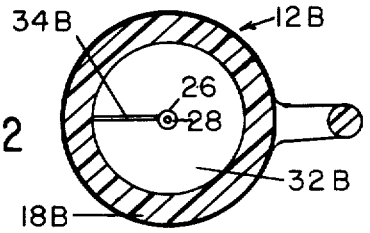
FIG. 2 is a horizontal sectional view taken substantially on the line 2—2 of FIG. 1.

As soon as the large portion of the line 14 is housed in one of the cavities, say cavity 24A of FIG. 1, the supports 12A and 12B are picked up, with one support in each hand, and held adjacent to one another and at substantially the same elevation in a manner substantially as shown in FIG. 3. In this position the large or first portion 40 of the line 14 is housed in the cavity 24A and a smaller or second portion 42 of the line 14 extends up out of the cavity 24A and over the upper convex rim 22A and is headed toward the support 12B by way of the short space between the supports 12A and 12B and thence over the upper convex rim 22B and down into the cavity 24B where the end 30B is held or attached as previously described. When the two supports 12A and 12B are held in the position shown in FIG. 3, the line 14 will remain substantially fixed.

Figure 4:
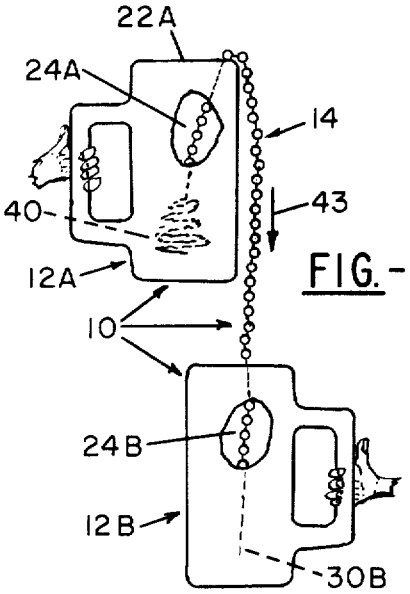
FIG. 4 is a view similar to FIG. 3 but showing the transfer of a portion of the line from an upper to a lower support.

In order to transfer the large or first portion 40 of the line 14 from the support 12A to the support 12B, the support 12A, as shown in FIG. 4, is positioned above the support 12B or the support 12B is positioned below the support 12A, making sure that the portion of the rim 22A over which the line 14 hangs is located substantially above the center of the cavity 24B. This causes some of the line 14 to hang substantially vertically, as shown in FIG. 4, from the upper support 12A to the lower support 12B. As soon as the vertical separation or relative elevational positions between the two supports becomes great enough, the force of gravity acts on the vertically hanging section of the line 14 and causes much of the line 14 to run, in the manner shown by the arrow 43 in FIG. 4, from the support 12A to the support [12B.] *12B, and also as shown in FIG. 4 to run up and out of the cavity 24A of the first support or receptacle 12A, over the smoothly rounded portion 22A of the first support or receptacle 12A and down into the second support or receptacle 12B.* In this instance, much of the line 14 is deposited or amassed in a heap in the cavity 24B in layers with the last fed-in parts resting on top of the previously fed-in parts.

Figure 5:
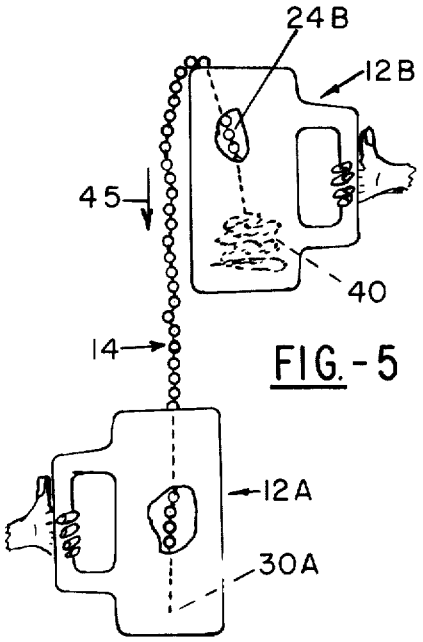
FIG. 5 is a view similar to FIG. 4 showing the relative positions of the supports interchanged, so that the direction of running of the line between the supports is reversed.

When most of the line 14 has been transferred from the upper support 12A to the lower support 12B, the elevational positions of the two supports are interchanged with the result that the support 12B which, as shown in FIG. 5, now holds the large or first portion 40 of the line 14, will now be above the support 12A. in this instance a section of the line 14 hangs vertically from the now upper support 12B to the now lower support 12A, and the force of gravity will cause the line 14 to run as shown by the arrow 45 in FIG. 5, from the support 12B to the support 12A. The vertical positions of the supports 12A and 12B can be interchanged as many times as desired, thus causing the line to run back and forth between the supports.

The convex portions or smoothly rounded rims or lips 22A and 22B preferably have a large enough radius of curvature so as to facilitate free running of the line 14 over the said rims. In other words, it is preferable that the curvature of the lips or rims be such that at no time will the line, regardless of which type of line is used, become snagged on the rim.

Figure 6:
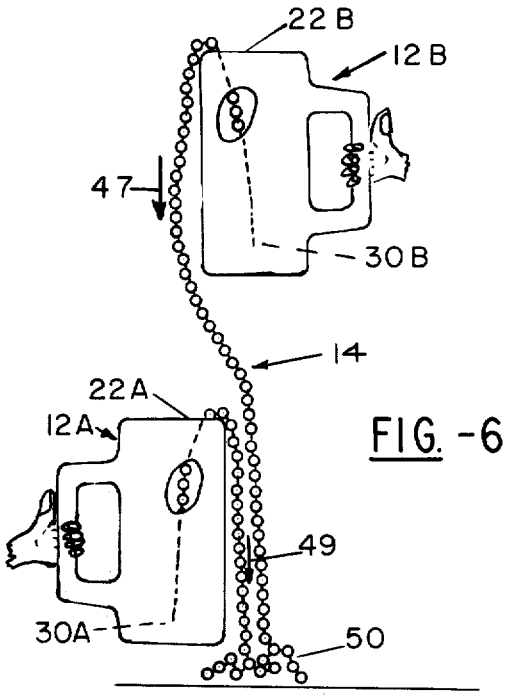
FIG. 6 is a view similar to FIG. 5 but illustrating a situation in which the individual using the plaything failed to cause all of the line to enter the lower support.

The vertical distance between which the two supports are held determines the speed at which the line 14 will run. As the supports are separated vertically from one another, a critical distance will be reached that will cause the line 14 to run slowly from the upper support to the lower support, and as the vertical separation is increased, the speed of running of the line 14 will increase. When the line 14 runs slowly, it is quite easy for an individual to cause the line 14 to enter the lower support. As the speed of running increases, it becomes more and more difficult for a person using the plaything 10 to control the entrance of the line 14 into the cavity of the lower support, with the result that the line 14 may spill over and out of the lower support 12A as shown in FIG. 6. If the line 14 should slop over the rim 22A of the lower support 12A, the line 14 will hang down substantially vertically, as shown in FIG. 6, from the lips 22A and 22B of both supports and will be pulled by the force of gravity from both supports, with the result that, in a few seconds all of the line 14, except for the ends 30A and 30B held to the supports 12A and 12B, will run out of both supports in the manner shown by the arrows 47 and 49 in FIG. 6, and pile up on the floor as shown at 50 of FIG. 6.

When two or more individuals begin to use the subject plaything 10 to play a game, each contestant will place his two supports 12A and 12B on a horizontal surface and, if necessary, hand feed most of the line 14 into one of the supports. Then all contestants will pick up their supports and hold the almost empty support and the almost full support at substantially the same elevation, or "at the ready," in a manner similar to that shown in FIG. 3. At a signal, each contestant either raises his full support or lowers his substantially empty support until the line 14 runs from the upper support to the lower support. The first contestant to complete the transfer of the line, without having the line spill over the rim of the lower support, wins the heat and scores one point. This operation is repeated as many times as desired and at the end of the game the contestant having the most points wins.

A restricted and somewhat less desirable use of the subject plaything can be accomplished by placing one of the supports, say the support 12A, on the edge of a table and then lowering the other support, say the support 12B, below the fixed support. Then after the line 14 has been transferred to the support 12B, the support 12B is raised above the fixed support 12A. This transfers the line 14 from the movable support 12B back to the fixed support 12A. This, of course, can be repeated.

MODIFICATIONS

Figure 7:
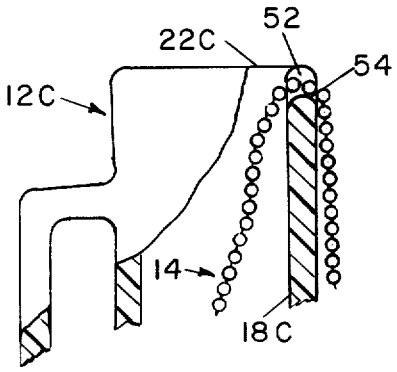
FIG. 7 is a fragmentary view, partly in cross section, of a modified form of the invention in which a support is equipped with an opening in the form of a spout used to guide the line.
Figure 8:
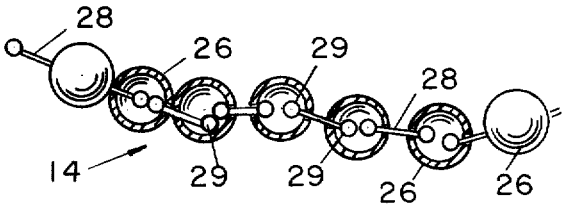
FIG. 8 is an enlarged view, partly in cross section, showing a short length of flaccid, conjoined concatenated line in the form of a bead chain of the type which forms part of the invention illustrated in FIGS. 1 through 7.

FIG. 7 discloses a modified form of the present invention as comprising a movable support 12C, which may be constructed the same as the supports 12A and 12B, except that an opening in the form of a notch or spout 52 is formed at any desirable location in the side wall 18C preferably adjacent to the lip 22C. This spout, as shown in the drawing, is preferably U-shaped and has a smoothly rounded portion or surface 54 and thus the line 14 will neither become snagged nor will the line 14 slither back and forth along the lip 22c. This arrangement helps a person control the movement or running of the line 14 as it leaves the upper support and enters the cavity of the lower support, which is not shown in FIG. 7.

Figure 9:
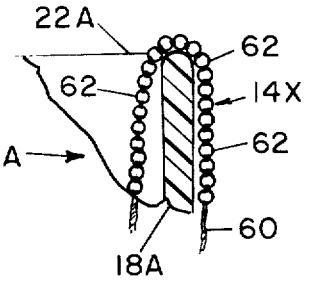
FIG. 9 is a fragmentary view of a portion of one of the supports, partly in cross section, and embodying the invention when the line used is in the form of a string of beads.
Figure 11:
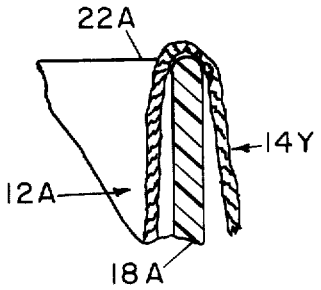
FIG. 11 is a fragmentary view similar to FIG. 9 embodying one form of the invention when the line used is in the form of a cord.
Figure 10:
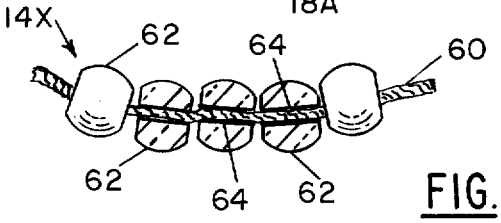
FIG. 10 is an enlarged view, partly in cross section, of a portion of the string of beads shown in FIG. 9.

FIGS. 9 through 11 illustrate modified forms of linear flaccid lines, which may be used in the present invention to replace the linear flaccid line 14 shown in FIGS. 1 through 8. FIG. 9 shows a portion of one of the supports 12A which is formed with a sidewall 18A having a round upper lip 22A over which runs a linear flaccid conjoined line 14X formed from a string 60 which mounts or is strung with a series of apertured beads 62, 62, 62. The apertures 64, 64, for which see FIG. 10, permit the beads 62, 62, 62, to be slidably mounted on the string 60, or if desired, at least some of the beads may be secured to the string 60 in any desired manner as for example by glue or other suitable means, not shown. The line 14X will be recognized as being a more or less conventional string of beads. FIG. 11 is similar to FIG. 9 but discloses a linear flaccid line 14Y formed from a cord or the like.

ADDITIONAL OPERATION

While it requires less skill to use a plaything in which each support or receptacle has an opening in the form of a notch or spout similar to the spout 52 shown in FIG. 7, many individuals — because of the increased skill required — will derive more enjoyment from using the supports 12A and 12B, which do not have such openings or spouts. When unspouted supports are used, the line 14 will slither back and forth along the rims 22A and 22B. This slithering results from the manner in which the flaccid line feeds from the cavity of the support. At times the line will feed from one location in the cavity, and at other times from another location.

It is apparent that a number of other modifications can readily be made without altering the basic inventive concept, for example, the above disclosure, which shows the subject plaything as comprising two movable supports or receptacles, does not preclude the use of one stationary and one movable support. In this latter instance, the stationary support can be a box fixed adjacent to the edge of a tabletop and the line transferred from the fixed box to the movable support and back again by moving the movable support alternately below the tabletop and above the tabletop.

Since certain changes may be made in the above device without departing from the scope of the invention involved it is intended that all matter contained in the above description or shown in the drawings accompanying this specification shall be interpreted as illustrative and not in a limited sense.

What is claimed is:

[1. A plaything comprising:

a first support;

a second support;

means associated with at least one of said supports for positioning at least one of said supports in a position at one time above and at another time below the other of said supports;

a linear flaccid line which because of its flaccidity is so constructed and arranged that it can be amassed with the last fed-in parts thereof resting on previously fed-in parts;

a first portion of said line resting on one of said supports with the last fed-in parts thereof resting on previously fed-in parts of said line; and a second portion of said line extending from the support on which said first portion rests to said other support, whereby when the positions of said supports are such that the support which carries said first portion is positioned above the other support, much of said first portion will — because of gravity — run from said support positioned above said other support to said other support.]

[2. The invention of claim 1 wherein said linear flaccid line comprises a series of separate members conjointly connected together.]

[3. The invention of claim 1 wherein said linear flaccid line comprises a series of concatenated members linked together.]

[4. The invention of claim 1 wherein said linear flaccid line comprises a chain.]

[5. The invention of claim 1 wherein said linear flaccid line comprises a string of beads.]

[6. The invention of claim 1 wherein said linear flaccid line comprises a cord.]

[7. The invention of claim 1 wherein opposite ends of said linear flaccid line are held to said first and second supports.]

[8. The invention of claim 1 wherein said first portion of said line rests in a heap on one of said supports.]

[9. A plaything comprising:

a first receptacle defining a cavity;

a second receptacle defining a cavity;

a linear flaccid line, which because of its flaccidity can run up and out of one cavity and down into another cavity and can be amassed in a heap with the last fed-in parts thereof resting on priviously fed-in parts;

a first portion of said line resting in a heap in said first receptacle with the last fed-in parts thereof resting on previously fed-in parts of said first portion of said line; and a second portion of said line extending from said first receptacle to said second receptacle, whereby when said first receptacle is positioned above said second receptacle, much of said first portion will — because of gravity — run from said first receptacle to said second receptacle.]

[10. The invention of claim 9 wherein at least one of said receptacles comprises a bottom and an upstanding member over which said flaccid line runs.]

[11. The invention of claim 9 wherein at least one of said receptacles comprises a bottom and a member upstanding from said bottom, said upstanding member being formed with an opening providing a spout for guiding said line as it runs from said receptacle.]

[12. The invention of claim 9 wherein said linear flaccid line comprises a chain.]

[13. The invention of claim 9 wherein said linear flaccid line comprises a string of beads.]

[14. The invention of claim 9 wherein said linear flaccid line comprises a cord.]

[15. The invention of claim 9 wherein at least one of said receptacles is provided with a handle, whereby said receptacle can be positioned with the cavity of said receptacle in an upwardly open position.]

16. A plaything comprising:

a first receptacle defining a cavity;

a handle secured to said first receptacle *said handle outstanding from said receptacle*, whereby said first receptacle can be positioned with said cavity in an upwardly open position;

a smoothly rounded portion formed on an upper portion of said first receptacle;

a second receptacle defining a cavity;

a handle secured to said second receptacle *said handle outstanding from said receptacle*, whereby said second receptacle can be positioned with said cavity in an upwardly open position below said first receptacle;

a smoothly rounded portion formed on an upper portion of said second receptacle;

a linear flaccid line comprising a series of separate members conjointly connected together and having two portions and two ends;

means for holding one end of said line within the cavity of said first receptacle; and means for holding the other end of said line within the cavity of said second receptacle, whereby when a portion of said line rests in the cavity of said first receptacle, with the last fed-in parts of said portion resting on top of the previously fed-in parts of said portion, and when said first receptacle is positioned above said second receptacle, said portion of said line in the cavity of said first receptacle, will — because of gravity — run up and out of said cavity of said first receptacle, over said smoothly rounded portion of said first receptacle and down into said second receptable.

*17. A plaything comprising:*

*a first support having an interior cavity with an end which opens upwardly to the exterior of said first support, said upwardly open end being not substantially smaller in cross section than the mean cross section of the remainder of said cavity and having means for stably maintaining said first support upon a horizontal surface;*

*a second support having an interior cavity with an end which opens upwardly to the exterior of said second support, said upwardly open end being not substantially smaller in cross section than the mean cross section of the remainder of said cavity and having means for stably maintaining said second support upon a horizontal surface;*

*means associated with at least one of said supports for positioning at least one of said supports in a position at one time above and at another time below the other of said supports;*

*a linear flaccid line having a first end and a second end, which line because of its flaccidity is so constructed and arranged that it can be amassed with the last fed-in parts thereof resting on previously fed-in parts;*

*a first portion of said line having as part thereof said first end and said first portion resting on one of said sup-*

*ports with the last fed-in parts thereof resting on previously fed-in parts of said line;*

*means so constructed and arranged as to hold said first end of said line to said support on which said first portion of said line rests;*

*a second portion of said line having as part thereof said second end and said second portion extending from the support on which said first portion rests to said other support; whereby when the positions of said supports are such that the support which carries said first portion is positioned above the other support, said line will hang vertically from said support on which said first portion of said line rests to said other support, and said first portion, except for said first end held to said support on which said first portion of said line rests, will — because of gravity acting on the vertically hanging line — be caused to run from said support positioned above said other support to said other support; and*

*means so constructed and arranged as to hold said second end to said other support.*

*18. The invention of claim 17 wherein said linear flaccid line comprises a series of separate members conjointly connected together.*

*19. The invention of claim 17 wherein said linear flaccid line comprises a series of concatenated members linked together.*

*20. The invention of claim 17 wherein said linear flaccid line comprises a chain.*

*21. The invention of claim 17 wherein said linear flaccid line comprises a string of beads.*

*22. The invention of claim 17 wherein said first portion of said line rests in a heap on one of said supports.*

*23. A plaything comprising:*

*a first receptacle having an interior cavity with an end which opens upwardly to the exterior of said first receptacle, said upwardly open end being not substantially smaller in cross section than the means cross section of the remainder of said cavity and having means for stably supporting said first receptacle upon a horizontal surface;*

*a second receptacle having an interior cavity with an end which opens upwardly to the exterior of said second receptacle, said upwardly open end being not substantially smaller in cross section than the mean cross section of the remainder of said cavity and having means for stably supporting said second receptacle upon a horizontal surface;*

*a linear flaccid line having two ends, which line because of its flaccidity can extend and run up and out of one cavity and down into another cavity and can be amassed in a heap with the last fed-in parts thereof resting on previously fed-in parts;*

*a first portion of said line including as part thereof one of said ends with said end of said first portion held to said first receptacle and said first portion resting in a heap in said first receptacle with the last fed-in parts thereof resting on previously fed-in parts of said first portion of said line; and*

*a second portion of said line including as part thereof said other end of said line with said other end being held to said second receptacle and said second portion extending from said first receptacle to said second receptacle, whereby when said first receptacle is positioned above said second receptacle, said line will hang vertically from said first receptacle to said second receptacle and said first portion, except for said end held to said first receptacle, will — because of gravity acting on the vertically hanging line — be caused to run up and out of said cavity of said first receptacle and down into said cavity of said second receptacle as soon as the vertical separation between said first and second receptacle is great enough.*

*24. The invention of claim 23 wherein at least one of said receptacles comprises a bottom and an upstanding member over which said flaccid line runs.*

*25. The invention of claim 23 wherein at least one of said receptacles comprises a bottom and a member upstanding from said bottom, said upstanding member being formed with an opening providing a spout for guiding said line as it runs from said receptacle.*

*26. The invention of claim 23 wherein said linear flaccid line comprises a chain.*

*27. The invention of claim 23 wherein said linear flaccid line comprises a string of beads.*

*28. The invention of claim 23 wherein at least one of said receptacles is provided with a handle, whereby said receptacle can be positioned with the cavity of said receptacle in an upwardly open position.*

*29. The invention of claim 23 wherein both of said receptacles comprise a bottom, an upstanding sidewall and a rim defining said upwardly open cavities, said cavities being at least of sufficient capacity to receive and house all of said line except for one of said ends of said line held to one of said receptacles, and wherein both of said receptacles are so constructed and arranged that the line wll slither back and forth along said rim of said receptacles, tgis slithering resulting from the fact that at times the line will feed from one location in said cavity and at other times from another location therein.*

*30. A plaything comprising:*

*a first receptacle having an interior cavity with an end which opens upwardly to the exterior of said first receptacle, said upwardly open end being not substantially smaller in cross section than the mean cross section of the remainder of said cavity and having means for stably supporting said first receptacle upon a horizontal surface;*

*a second receptacle having an interior cavity with an end which opens upwardly to the exterior of said second receptacle, said upwardly open end being not substantially smaller in cross section than the mean cross section of the remainder of said cavity and having means for stably supporting said second receptacle upon a horizontal surface;*

*a linear flaccid line having two ends, and said line comprising a series of separate members conjointly connected together and which because of its flaccidity can be amassed in a heap with the last fed-in parts thereof resting on previously fed-in parts, and which can extend up and out of one of said cavities and down into the other of said cavities;*

*a first portion of said line having as part thereof one of said ends held to said first receptacle and said first portion being amassed in a heap in said cavity of said first receptacle with the last fed-in parts thereof resting on previously fed-in parts of said first portion of said line; and*

*a second portion of said line having as part thereof the other and of said line held to said second receptacle and said second portion extending up and out of said cavity of said first receptacle and down into said cavity of said second receptacle, whereby when said first receptacle is positioned above said second receptacle, said line will hang vertically from said first receptacle to said second receptacle with the result that as soon as*

*the vertical separation between said first and second receptacles becomes great enough said first portion, except for said end of said line held to said first receptacle, will — because of gravity acting on the vertically hanging line — be caused to run up and out of said cavity of said first receptacle and down into said cavity of said second receptacle, with said line becoming amassed in a heap in said cavity of said second receptacle with the last fed-in parts thereof resting on previously fed-in parts so that, when the elevational positions of said first and second receptacles are interchanged to place said second receptacle above said first receptacle, said line will hang vertically from said second receptacle to said first receptacle, with the result that as soon as the vertical separation betweeen said second and first receptacles becomes great enough said line which is amassed in said second receptacle, except for said end of said line held to said second receptacle, will — because of gravity acting on the vertically hanging line — be caused to run up and out of said cavity of said second receptacle and down into said cavity of said first receptacle.*

*31. The invention of claim 30 wherein said linear flaccid line comprises a series of concatenated members linked together.*

*32. The invention of claim 30 wherein said linear flaccid line comprises a chain.*

*33. The invention of claim 30 wherein said linear flaccid line comprises a string of beads.*

*34. The invention of claim 30 wherein each of said receptacles comprises a bottom and an upstanding member formed with a rim portion over which said flaccid line runs.*

*35. The invention of claim 30 wherein each of said receptacles conprises a bottom and a member upstanding from said bottom, said upstanding members each being formed with an opening providing a spout for guiding said line as it runs from said receptacle.*

*36. The invention of claim 30 wherein both of said receptacles are provided with handles, whereby said receptacles can be positioned with said cavities in upwardly open positions.*

*37. The invention of claim 30 wherein both of said receptacles comprise a bottom, an upstanding sidewall and a rim defining said upwardly open cavities, said cavities being at least of sufficient capacity to receive and house all of said line except for one of said ends of said line held to one of said receptacles, and wherein both of said receptacles are so constructed and arranged that the line will slither back and forth along said rim of said receptacles, this slithering resulting from the fact that at times the line will feed from one location in said cavity and at other times from another location therein.*

*38. A plaything comprising in combination:*

*a linear flaccid line which because of its flaccidity is so constructed and arranged that it can be amassed in a heap with the last fed-in parts thereof resting on previously fed-in parts;*

*a first receptacle comprising a bottom, an upstanding sidewall, and a rim formed on the upper edge of said sidewall, said bottom and upstanding sidewall defining an upwardly open cavity of sufficient capacity to house said line when said line is amassed in a heap with the last fed-in parts of said line resting on previously fed-in parts thereof, and said rim defining an unobstructed opening at the upper end of said cavity of said first receptacle;*

*a first end formed as part of said linear flaccid line;*

*means holding said first end of said line to said first receptacle at a location within said cavity of said first receptacle;*

*a second receptacle comprising a bottom, an upstanding sidewall, and a rim formed on the upper edge of said sidewall, said bottom and upstanding sidewall defining an upwardly open cavity of sufficient capacity to house said line when said line is amassed in a heap with the last fed-in parts of said line resting on previously fed-in parts thereof, and said rim defining an unobstructed opening at the upper end of said cavity of said second receptacle;*

*a second end formed as part of said linear flaccid line;*

*means holding said second end of said line to said second receptacle at a location within said cavity of said second receptacle;*

*a first portion of said linear flaccid line, including as part thereof said first end, said first portion being amassed in a heap in said upwardly open cavity of said first receptacle;*

*a second portion of said line, including as part thereof said second end, said second portion of said line extending up and out of said cavity of said first receptacle, over said rim of said first receptacle, and, when said second receptacle is adjacent to said first receptacle, toward said second receptacle, over said rim of said second receptacle and down into said cavity of said second receptacle, whereby when said first receptacle is positioned above said second receptacle, said line will hang vertically from said first receptacle to said second receptacle with the result that as soon as the vertical separation between said first and second receptacles becomes great enough said first portion, except for said first end held to said first receptacle, will — because of gravity acting on the vertically hanging line — be caused to run up and out of said cavity of said first receptacle, over said rim of said first receptacle and down into said cavity of said second receptacle, said line as it runs over said rim of said first receptacle slithering back and forth, said slithering resulting from said line at one time feeding from one location in said cavity of said first receptacle and at other times feeding from another location in said cavity, the said rim-defined opening of said upwardly open cavity of said second receptacle being large enough to receive said running line as it slithers back and forth over said rim of said first receptacle and runs down into said cavity of said second receptacle.*

*39. The invention of claim 38 wherein said linear flaccid line comprises a chain.*

*40. The invention of claim 38 wherein said linear flaccid line comprises a string of beads.*

*41. The invention of claim 38 wherein said linear flaccid line comprises a series of separate members conjointly connected together.*

* * * * *